(12) United States Patent
Ehara

(10) Patent No.: US 6,714,399 B2
(45) Date of Patent: Mar. 30, 2004

(54) METHOD OF CONTROLLING SOLENOID ACTUATOR

(75) Inventor: Takayuki Ehara, Tokyo (JP)

(73) Assignee: Max Co., Ltd., Tokyo (JP)

( * ) Notice: Subject to any disclaimer, the term of this patent is extended or adjusted under 35 U.S.C. 154(b) by 191 days.

(21) Appl. No.: 10/076,598

(22) Filed: Feb. 19, 2002

(65) Prior Publication Data
US 2002/0114122 A1 Aug. 22, 2002

(30) Foreign Application Priority Data
Feb. 19, 2001 (JP) ..................... P2001-042069

(51) Int. Cl.$^7$ ............ H01G 47/00; H01G 9/00
(52) U.S. Cl. .................. 361/160; 361/152
(58) Field of Search ................. 361/152, 154, 361/160, 153, 170

(56) References Cited

U.S. PATENT DOCUMENTS 4,399,483 A * 8/1983 Phelan ............... 361/154
4,949,215 A * 8/1990 Studtmann et al. ......... 361/154

FOREIGN PATENT DOCUMENTS

JP  8-277956 A  10/1996

OTHER PUBLICATIONS

K.W. Lim et al., "Proportional Control of a Solenoid Actuator," International Conference on Industrial Electronics, Control and Instrumentation, Mar. 1994, pp. 2045–2050.

* cited by examiner

Primary Examiner—Anthony Dinkins
(74) Attorney, Agent, or Firm—Morgan, Lewis & Bockius LLP

(57) ABSTRACT

When a solenoid drive current I is controlled toward a certain target current value $I_T$, overshoot and undershoot relative to the target current value are repeated such that the current settles down to the target current value. The solenoid drive current is so controlled as to settle down to the target current value after the current is swung up and down. As a result, the attracting force settles down to the midway point of the variation between the attracting force characteristics in the current-increasing direction and the current-reducing direction, respectively, of the solenoid actuator. The hysteresis characteristics can be canceled out.

4 Claims, 2 Drawing Sheets

METHOD OF CONTROLLING SOLENOID ACTUATOR

BACKGROUND OF THE INVENTION

1. Field of the Invention

This invention relates to a method of controlling a solenoid actuator and, more particularly, to a method of controlling a solenoid actuator in such a way as to eliminate variations in the attracting force due to hysteresis characteristics.

2. Description of the Related Art

FIG. 3 shows the current/attracting force characteristics of a solenoid actuator. A hysteresis loop is drawn in which the characteristic produced when the drive current I is increased from zero and the characteristic produced when the current is reduced from its maximum value are not coincident. As shown in FIG. 4, in case (a), the drive current I is increased to a target current value $I_T$. In case (b), the current is reduced from a current value higher than the target current value $I_T$ and reaches the target current value $I_T$. As shown in FIG. 5, the case (b) exhibits stronger attracting force f than the case (a).

Depending on the mode of use of the solenoid actuator, variations in the attracting force due to hysteresis characteristics may present no problems. However, where more accurate control of attracting force is necessary, hysteresis characteristics pose problems.

For example, in a cutting machine for a cut sheet for making cut lettering by driving a cutting head up and down by a solenoid actuator or in a pen plotter for drawing figures by vertically driving a pen head by a solenoid actuator, where soft landing control for increasing the drive current from zero to a target value and speed landing control for reducing the current to the target value immediately before the cutter or pen is made to land by passing a large current through the solenoid to lower the head at a high speed are performed, the pressure of ground contact of the cutter or pen varies depending on the control method.

SUMMARY OF THE INVENTION

Accordingly, a technical problem to be solved occurs to eliminate variations in the attracting force due to the hysteresis characteristics of a solenoid actuator. The present invention is intended to solve the foregoing problem.

This invention is proposed to achieve the above-described object, and provides a method of controlling a solenoid actuator, the method including the step of: canceling hysteresis characteristics of the solenoid actuator by solenoid drive current control means that stabilizes a solenoid drive current to a target value through a swinging period in which the solenoid drive current is swung up and down about the target value when the solenoid drive current is controlled toward the target value.

DETAILED DESCRIPTION OF THE PREFERRED EMBODIMENTS

Figure 1:
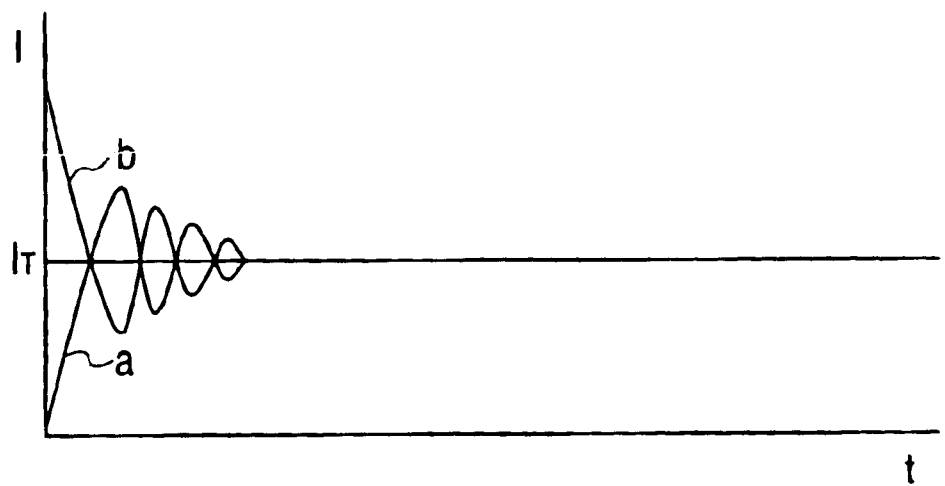
FIG. 1 is a graph of a solenoid drive current according to a solenoid actuator control method of the present invention.

One mode for carrying out this invention is hereinafter described by referring to the drawings. FIG. 1 is a graph showing a solenoid drive current. In case (a), the solenoid drive current I is increased up to a certain target current value $I_T$. In case (b), the drive current I is reduced from a value higher than the target current value $I_T$ and reaches the target current value. In either case, the current is so controlled that overshoot and undershoot relative to the target current value IT repeat several times. The amplitude attenuates gradually and settles down to the target current value $I_T$.

Figure 2:
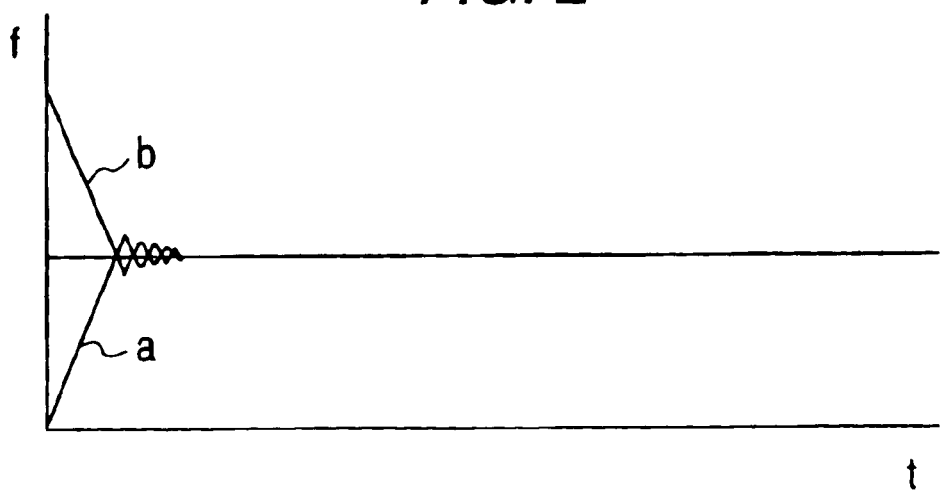
FIG. 2 is a graph of attracting force characteristics according to a solenoid actuator control method of the present invention.
Figure 3:
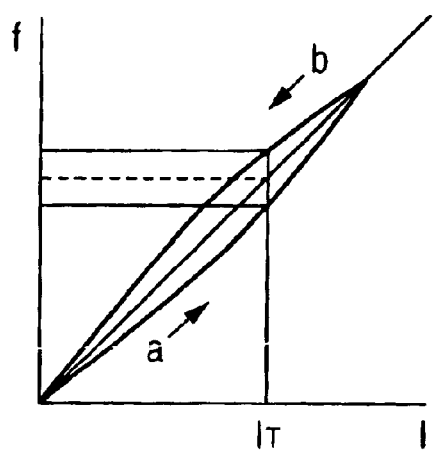
FIG. 3 is a graph of current/attracting force characteristics of a solenoid actuator.
Figure 4:
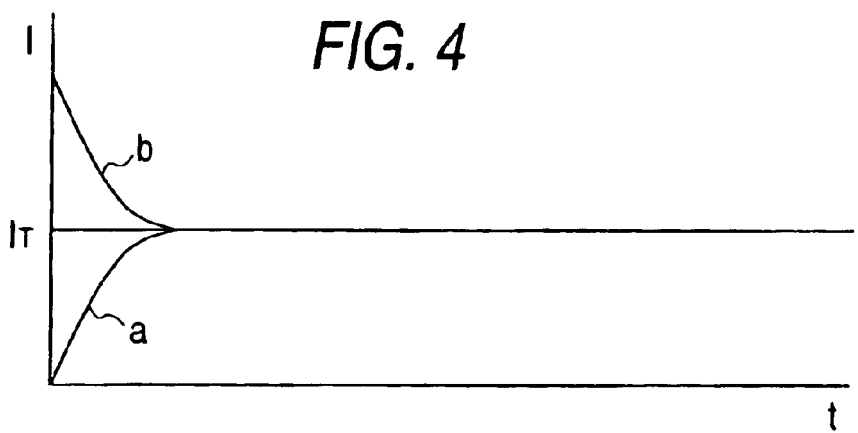
FIG. 4 is a graph of solenoid drive current according to the conventional solenoid actuator control method.
Figure 5:
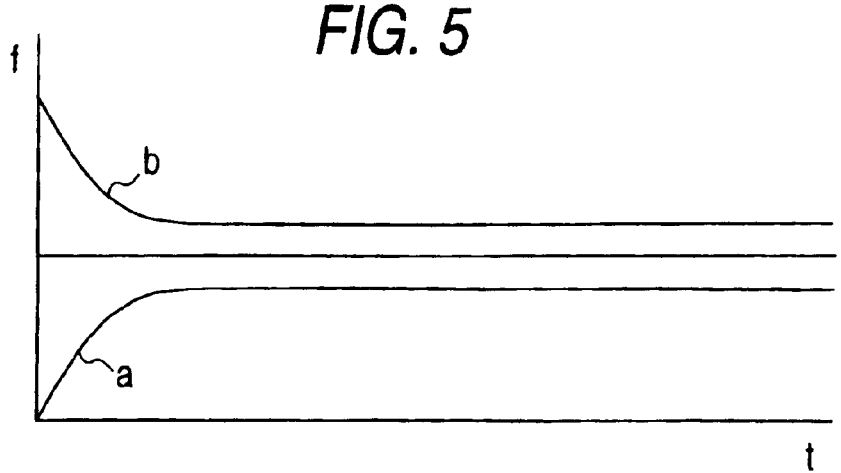
FIG. 5 is a graph of attracting force characteristics according to the conventional solenoid actuator control method.

The solenoid drive current is controlled so as to settle down to the target current value after swung up and down about the target current value in this way. The attracting force of the solenoid actuator swings up and down within the hysteresis loop shown in FIG. 3. The attracting force of the solenoid actuator settles down to the midway point between the upper and lower points at which the target current value crosses the hysteresis loop. Thus, the hysteresis characteristics of the solenoid actuator are canceled. Consequently, as shown in FIG. 2, the attracting force f remains the same at the same target current value in both of the case (a) where the drive current I is increased and the case (b) where the drive current I is reduced.

Various kinds of circuits can be utilized as the aforementioned current control means. In one example of configuration, a VCO (voltage-controlled oscillator) is started with using the leading edge of a current control signal as a trigger, the current control signal being supplied from a solenoid control circuit to a solenoid drive circuit. An alternating wave produced from the VCO is superimposed on the current control signal for a given time. In another example of configuration, a software program causes a microprocessor to produce a control signal analogous to the current value pattern of FIG. 1, and the microprocessor directly delivers a control signal to the solenoid drive circuit. In this way, no specific limitations are imposed.

It is to be noted that this invention is not restricted to the embodiment described above. Various changes and modifications are possible within the technical scope of this invention. Of course, this invention covers these modifications.

As described thus far, a method of controlling a solenoid actuator in accordance with the present invention consists of controlling a solenoid drive current so as to settle down to a target current value by swinging the solenoid drive current above and below the target current value. This cancels the hysteresis characteristics of the solenoid actuator. The attracting force is prevented from varying between the case in which the drive current is increased and reaches the target current value and the case in which the drive current is reduced to the target current value and reaches the target current value. In consequence, accurate control of the attracting force is made feasible.

What is claimed is:

1. A method of controlling a solenoid actuator, comprising the step of:

canceling hysteresis characteristics of the solenoid actuator by a solenoid drive current controller that stabilizes a solenoid drive current to a target value through a swinging period in which the solenoid drive current is swung up and down about the target value when the solenoid drive current is controlled toward the target value.

2. The method according to claim 1, further comprising the steps of:
  starting the solenoid drive current controller with using a leading edge of a current control signal as a trigger; and
  superimposing an alternating wave produced from the solenoid drive current controller on the current control signal for a given time.

3. The method according to claim 2, wherein the current control signal for starting the solenoid drive current controller is supplied from a solenoid control circuit to a solenoid drive circuit.

4. The method according to claim 1, further comprising the steps of:
  producing a control signal analogous to a current value pattern for the solenoid actuator;
  delivering the control signal to a solenoid drive circuit.

* * * * *